United States Patent
Salkintzis (10) Patent No.: US 10,264,438 B2
(45) Date of Patent: Apr. 16, 2019

(54) METHOD AND SYSTEM FOR MODIFYING BEHAVIOR OF AN INTERNET-OF-THINGS DEVICE BASED ON PROXIMAL PRESENCE OF A MOBILE DEVICE

(71) Applicant: MOTOROLA MOBILITY LLC, Chicago, IL (US)

(72) Inventor: Apostolis Salkintzis, Athens (GR)

(73) Assignee: MOTOROLA MOBILITY LLC, Chicago, IL (US)

( * ) Notice: Subject to any disclaimer, the term of this patent is extended or adjusted under 35 U.S.C. 154(b) by 227 days.

(21) Appl. No.: 15/016,203

(22) Filed: Feb. 4, 2016

(65) Prior Publication Data

US 2017/0006454 A1    Jan. 5, 2017

Related U.S. Application Data

(60) Provisional application No. 62/187,133, filed on Jun. 30, 2015.

(51) Int. Cl.
| | |
|---|---|
| *H04W 8/00* | (2009.01) |
| *H04W 4/80* | (2018.01) |
| *H04L 29/08* | (2006.01) |
| *H04W 4/02* | (2018.01) |
| *H04W 8/18* | (2009.01) |

(52) U.S. Cl.
CPC ............ *H04W 8/005* (2013.01); *H04L 67/12* (2013.01); *H04L 67/20* (2013.01); *H04L 67/306* (2013.01); *H04W 4/023* (2013.01); *H04W 4/80* (2018.02); *H04W 8/183* (2013.01)

(58) Field of Classification Search
CPC ............................... H04W 8/005; H04L 67/12
See application file for complete search history.

(56) References Cited

U.S. PATENT DOCUMENTS

2002/0138433 A1*  9/2002  Black ................. G06Q 20/1085
                                                                    705/43
2009/0254416 A1* 10/2009  Nomula ................ G06Q 30/02
                                                                    705/14.52
(Continued)

FOREIGN PATENT DOCUMENTS

GB            2373678 A       9/2002

OTHER PUBLICATIONS

International Preliminary Report on Patentability dated Jan. 11, 2018 for International Application No. PCT/US2016/034983, 10 pages.
(Continued)

*Primary Examiner* — Zhengsheng Zhang (57) ABSTRACT

A server performs a method for modifying behavior of an Internet-of-things device based on proximal presence of a mobile device. The method includes receiving a first presence code that indicates proximal presence of a first mobile device without identifying a user of the first mobile device, providing the first presence code to a first network that manages user profiles, and receiving, from the first network, a first profile for the user of the first mobile device. The method further includes determining, based on the first profile, first adaptation data for an Internet-of-things device in proximity to the first mobile device. The first adaptation data is used to modify behavior of the Internet-of-things device based on the proximal presence of the first mobile device.

17 Claims, 4 Drawing Sheets

(56) References Cited

U.S. PATENT DOCUMENTS

2013/0155076 A1  6/2013  Wodka et al.
2014/0187267 A1  7/2014  Yang et al.
2014/0286193 A1  9/2014  Ghaboosi et al.

OTHER PUBLICATIONS

QUALCOMM Incorporated et al., "Restricted ProSe Direct Discovery Model A procedures," 3GPP Draft; 23303-CR0168R2_Eprose-EXTSA2_(REL-13)_S2-152001-CR-TO 23 303 for Restricted Discovery Baseline-R7, 3rd Generation Partnership Project (3GPP), Mobile Competence Centre; 650, Route Des Luc, vol. SA WG2, No. Fukuoka, Japan; May 25, 2015-May 29, 2015 Jun. 15, 2015 (Jun. 15, 2015), XP050981984, Retrieved from the Internet: URL:http://www.3gpp.org/ftp/Meetings_3GPP SYNC/SNDocs/ [retrieved on Jun. 15, 2015].

* cited by examiner

METHOD AND SYSTEM FOR MODIFYING BEHAVIOR OF AN INTERNET-OF-THINGS DEVICE BASED ON PROXIMAL PRESENCE OF A MOBILE DEVICE

RELATED APPLICATIONS

The present application is related to and claims benefit under 35 U.S.C. § 119(e) from U.S. Provisional Patent Application Ser. No. 62/187,133, filed Jun. 30, 2015, titled "Method and System for Modifying Behavior of an Internet-of-things Device based on Proximal Presence of a Mobile Device", which is commonly owned with this application by Motorola Mobility LLC, the entire contents of which are incorporated herein by reference.

FIELD OF THE DISCLOSURE

The present disclosure relates generally to Internet-of-Things devices and more particularly to a method and system for modifying behavior of an Internet-of-Things device based on proximal presence of one or more mobile devices.

BACKGROUND

5th generation (5G) mobile networks and wireless systems denote the next major phase of mobile telecommunications standards beyond the current 4G standards. One expected feature of 5G networks is the capability of connecting to billions of Internet-of-Things (IoT) devices. As used herein, an IoT device is a device having a unique identity, is configured for wireless and/or wireline connectivity to a network such as the Internet, and has embedded, therein, circuitry for performing a function relative to users and/or mobile devices within its proximity. Also, as the numbers and types of these IoT devices continue to expand, it is expected that enhancements will be developed whereby IoT devices can interact with users and/or mobile devices or adapt their behavior depending on the users and/or mobile devices near the IoT devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Pursuant to the various embodiments are methods and a system for modifying behavior of an Internet-of-Things device based on proximal presence of one or more mobile devices. For a particular embodiment an IoT device receives a set of one or more presence codes from a corresponding set of one or more mobile devices in proximity to the IoT device. A mobile device "in proximity" to an IoT device is a mobile device that is close enough to the IoT device for the IoT device to at least receive presence codes transmitted, for instance broadcasted, by the mobile device. Accordingly, proximity can denote physical and/or communicative proximity. Each presence code that the IoT device receives is characterized in that it identifies proximal presence of a mobile device without specifically identifying a user of the mobile device.

The IoT device provides the set of presence codes to a server, for instance an application server (AS), with which the IoT device communicates, which is denoted herein as an IoT AS. The IoT AS presents the set of presence codes to one or more networks to obtain user profiles for the one or more users of the set of mobile devices proximate to the IoT device. Each user profile contains some type of data or information about the user without specifically identifying a user of the mobile device. The user profiles are used either by the IoT server or the IoT device to generate adaptation data used to modify behavior of the IoT device based on the proximal presence. For example, the adaptation data automatically modifies the behavior of the IoT device based on interests or preferences of users close to the IoT device.

The teachings here do not require disclosing the mobile device identities or any personal or private user-related or mobile-device related information to the IoT device or IoT server. Accordingly, sensitive data can be maintained secure while still adapting the behavior of an IoT device based on users in its vicinity. Furthermore, implementation without having to disclose user or mobile device identities to the IoT AS is important when a third-party IoT provider that is not authorized to access such sensitive data deploys the AS.

Figure 1:
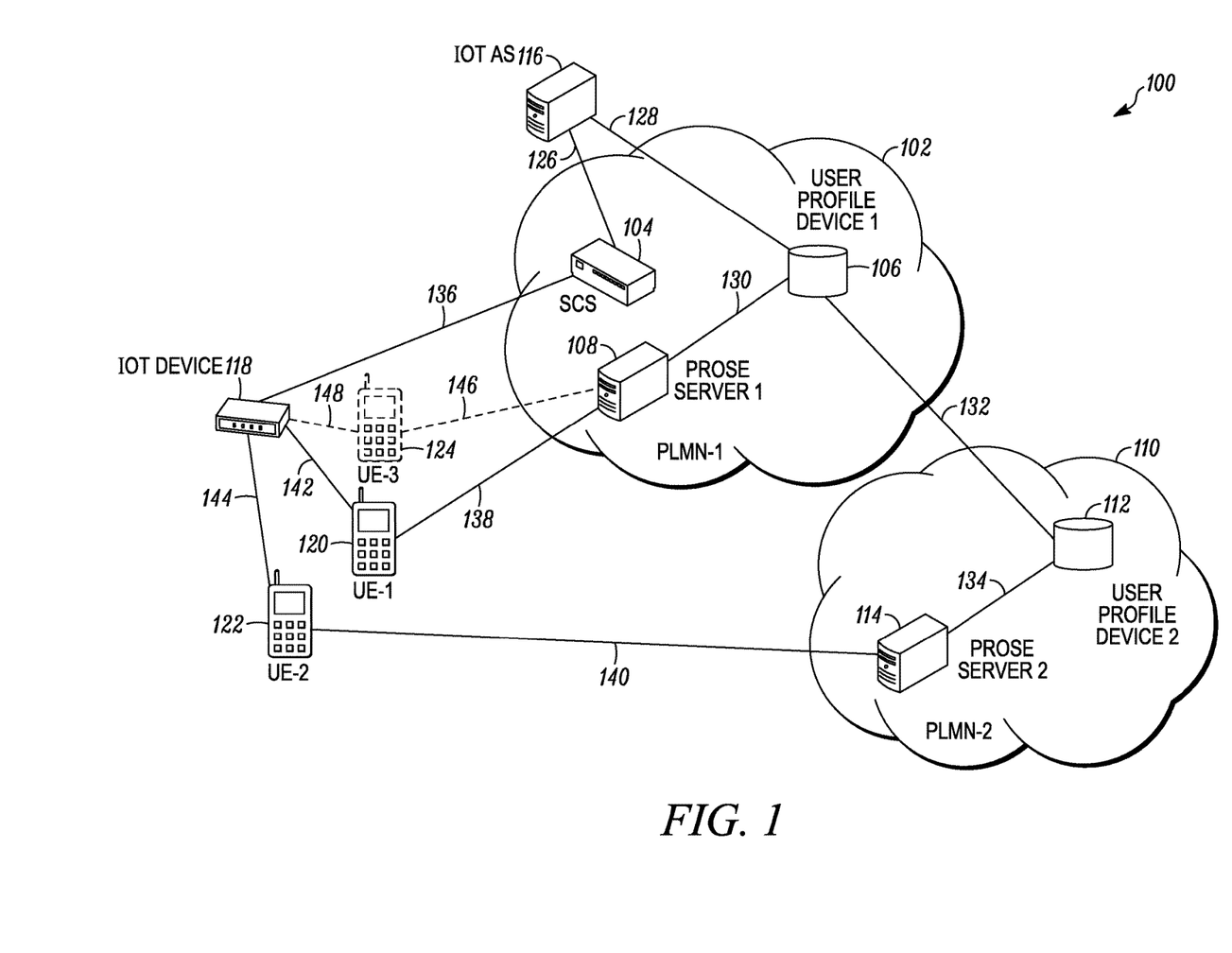
FIG. 1 is a schematic diagram illustrating an environment that supports modifying behavior of an Internet-of-Things device based on proximal presence of one or more mobile devices in accordance with some embodiments.

FIG. 1 illustrates a schematic diagram of an example environment 100 within which may be implemented methods and devices for facilitating modifying behavior of an Internet-of-Things (IoT) device based on proximal presence of one or more mobile devices, in accordance with the present teachings. As illustrated, environment 100 includes a public land mobile network (PLMN)-1 102, a PLMN-2 110, and an IoT AS 116, and IoT device 118, and three mobile devices or user equipment (UE), namely a UE-1 120, a UE-2 122, and a UE-3 124. The acronym "UE" is used herein in the singular and the plural depending on the context.

As described, the devices within the environment 100 operate in accordance with, consistent with, or in one or more ways compatible with 3$^{rd}$ Generation Partnership Project (3GPP) standards or technical specifications (TSs). Accordingly, the PLMNs 102 and 110 are 3GPP networks containing network elements that are configured to operate and communicate within and/or external to the network according to one or more 3GPP TSs. Likewise, the devices 116, 118, 120, 122, and 124 outside of the networks 102 and 110 are also configured to communicate with each other and/or one or more network elements using 3GPP TSs. However, this communication environment 100 implementation is meant only to serve as an example and in no way limit the disclosed embodiments to other types of network deployments and associated communication protocols.

For an embodiment, an IoT service provider deploys one or more IoT devices, for instance, the IoT device 118. In an implementation scenario, the IoT devices are deployed in a public area such as a mall or store, which is frequented by many users looking to purchase items. For instance, the IoT device 118 is configured as a digital display to present advertisements to passersby. Implementing the disclosed teachings allows the advertisements to be changed on the digital display 118 based, for example, on the interests and/or preferences of users walking near the IoT device 118.

Further to this implementation scenario, the IoT AS 116 registers and manages the IoT device 118 and any other IoT devices (not shown) deployed by the IoT service provider. Accordingly, the IoT server 116 maintains the identity of the IoT device 118 and provides the IoT device 118 with adaptation data used to modify the behavior of, e.g., modify the ads displayed on, the IoT device 118 because of the mobile devices, and hence the mobile device users, having proximal presence to or, in other words, being near or in proximity to the IoT device 118. For a 3GPP implementation, the communications between the IoT server 116 and the IoT device 118 can be supported by existing machine-to-machine (M2M) architecture specified by 3GPP TS 23.682, for instance.

The UE 120, 122, 124 can be representative of a variety of mobile devices or user equipment including, for example, cellular telephones, personal digital assistants (PDAs), smart phones, laptop computers, tablets, phablets, wearable devices such as smart watches and smart glasses, or other handheld or portable electronic devices. As shown, the UE are each configured to establish links or connections, for instance wireless links, to one of the networks 102 or 110. For an embodiment, a mobile device user is a cellular subscriber of a PLMN that offers proximity services (ProSe) that enables device discovery and device-to-device communication, e.g. according to 3GPP TS 23.303. Particularly, proximity services enable a user's mobile device to announce its presence using a presence code. The presence code enables another device to detect presence of the mobile device that sent the presence code without being made aware of the identity of the user or the mobile device. For the 3GPP embodiment, the presence code is referred to herein as a proximity-related services code (or "ProSe code") and is further referred to in the 3GPP specification as a "ProSe App Code" because each code can be related with an application such as Facebook, Twitter, etc.

For purposes of the present description, it is assumed that a user of the UE-2 122 is a subscriber of the PLMN-2 110, and the users of both the UE-1 120 and the UE-3 124 are subscribers of the PLMN-1 102. Accordingly, as shown, the UE-1 and UE-3 can establish a wireless link 138 and 146, respectively, with a network element in the PLMN-1 102 (in this case a ProSe server 1 108 that is also referred to as a ProSe function) to receive a ProSe code. Likewise, the UE-2 can establish a wireless link 140 with a network element in the PLMN-2 110 (in this case a ProSe server 2 114) to receive a ProSe code. The UE 120, 122, and 124 are each further configured to communicate using a wireless link 142, 144, and 148, respectively, with the IoT device 118 to provide their ProSe codes to the IoT device 118. For a particular embodiment, the UE 120, 122, and 124 send, namely broadcast, their ProSe codes over direct wireless links 142, 144, and 148 using a wireless peer-to-peer (P2P) technology such as LTE-Direct, WiFi-Direct, or Bluetooth low energy (BLE).

The PLMN-1 102 includes further network elements of a service capability server (SCS) 104 and a user profile device 1 106. The SCS 104 couples the IoT device 118 to the IoT AS 116 using links 126 and 136. The SCS 104 is an optional element in the M2M architecture defined in 3GPP TS 23.682 and exposes a well-defined API to application servers for supporting a range of M2M applications. Accordingly, in an alternative embodiment, the IoT AS 116 and IoT device 118 communicate without the intervening SCS 104. The user profile device 106 maintains user profiles for every user in PLMN-1 for use in accordance with the disclosed embodiments. The device 106 can represent a separate network or functional element or represent functionality that co-exists with another functional or network element with a 3GPP network, such as a Home Subscriber Server (HSS). Accordingly, the user profile device and also be thought of as a user profile function executing on a device. The user profile device 106 couples between the IoT AS 116 and the ProSe server 108 over links 128 and 130. The PLMN-2 110 also includes a user profile device 2 112 that couples between the user profile device 106 and the ProSe server 114 over links 132 and 134. The user profile device 112 maintains user profiles for every user in PLMN-2 for use in accordance with the disclosed embodiments.

The following elements are further included within the PLMNs 102 and 110, although not shown. More particularly, each PLMN includes an access network, which can use any type of radio access technology (RAT) for a UE to access and communicate using the PLMN. The access networks can be cellular access networks or cellular networks, having at least one cellular tower or base station for facilitating the establishment of wireless links by user devices to the access networks. The PLMNs 102 and 110 also include a core network. For a 3GPP network embodiment, the cellular networks can include Evolved UMTS Terrestrial Radio Access Networks (E-UTRANs) or legacy UTRANs having at least one eNodeB or NodeB for facilitating wireless links for UE such as the UE 120, 122, and 124. The core networks that support the cellular networks are, correspondingly, System Architecture Evolution (SAE) cores, also referred to in the art as Evolved Packet Cores (EPCs). The EPC subcomponents (not shown) can include, among other subcomponents, a Mobility Management Entity (MME), a Serving Gateway (S-GW), a PDN Gateway (P-GW), a Home Subscriber Server (HSS), etc.

Notwithstanding, any other cellular or cellular-based access technology can be used. Such technologies include, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), IEEE 802.16, etc., or variants thereof.

Additionally, although not shown, environment 100 can further include other networks coupled to and supported by the core networks and accessible to UE 120, 122, and 124. Such networks include, for example: the Internet; one or more packet data networks (PDNs); or one or more Wireless Local Area Networks (WLANs). The WLANs have at least one access point for facilitating wireless links using, for instance, Institute of Electrical and Electronics Engineers (IEEE) 802.11 standards, also referred to in the art as WiFi technology, or using Worldwide Interoperability for Microwave Access (WiMax) technology. A PDN can be, for instance, an enterprise network, an IP Multimedia Subsystem (IMS), etc.

Figure 2:
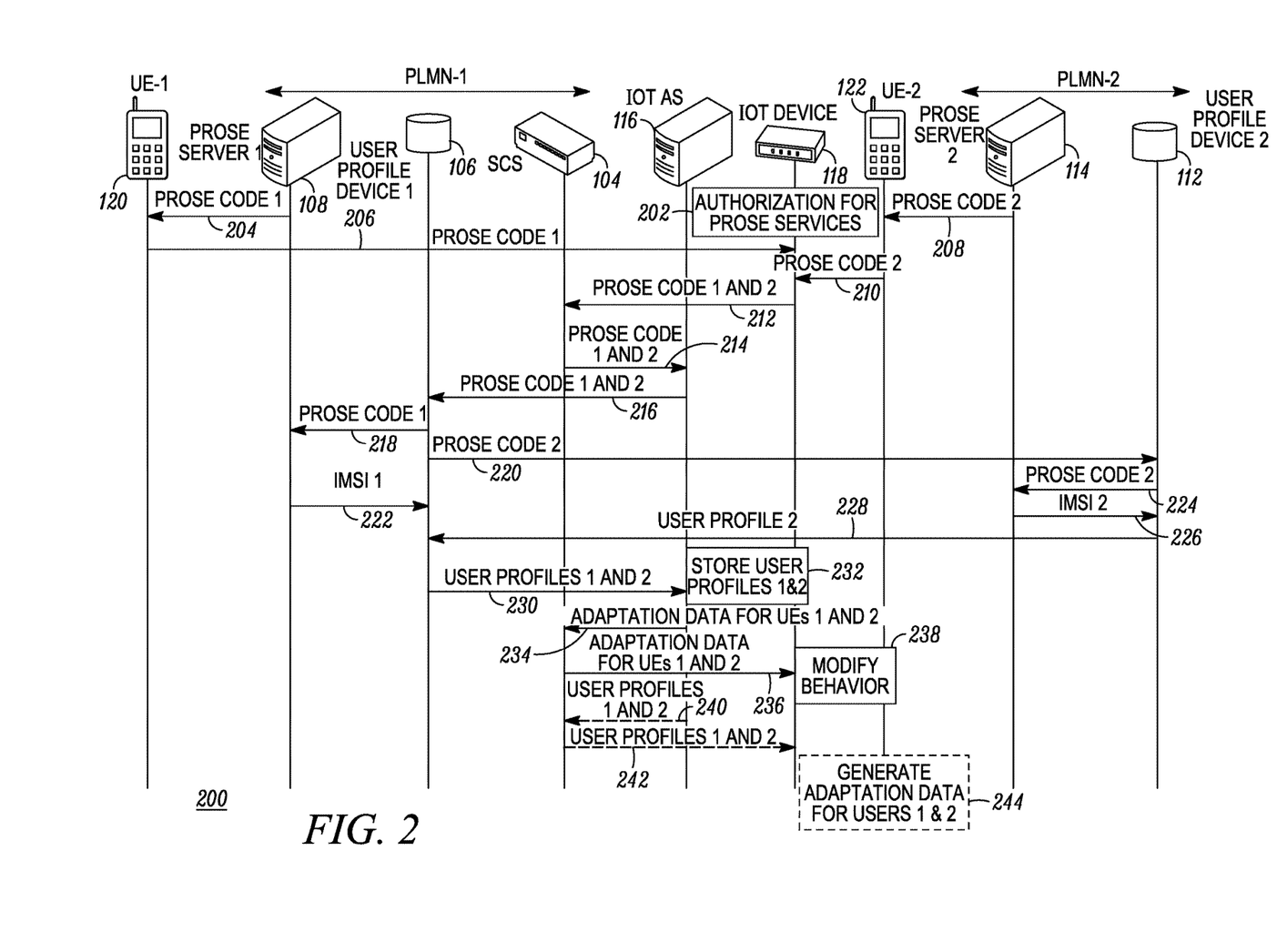
FIG. 2 is a message sequence diagram illustrating collaborative functionality for facilitating modifying behavior of an Internet-of-Things device based on proximal presence of one or more mobile devices in accordance with an embodiment.

FIG. 2 is a message sequence diagram 200 illustrating collaborative functionality for facilitating modifying behavior of the IoT device 118 based on proximal presence of one or more mobile devices, consistent with the present teachings. Diagram 200 shows messages being exchanged between two or more of the devices of: UE-1 120; the ProSe server 1 108 of the PLMN-1 102; the user profile device 106 of the PLMN-1 102; the SCS 104 of the PLMN-1 102; the IoT AS 116; the IoT device 118; UE-2 122; the ProSe server 2 114 of the PLMN-2 110; and the user profile device 112 of the PLMN-2 110. The message exchanges can be in accordance with any suitable protocol either standard or proprietary including, but not limited to, OAuth protocol, Hypertext Transfer Protocol (HTTP), Internet Protocol (IP), etc.

The message sequence diagram 200 correlates to a point in time when the UE 120 and the UE 122 are proximate to the IoT device 118. For an embodiment, the IoT device 118 is authorized 202 to perform ProSe monitoring in one or more D2D radio resources. This authorization is either pre-configured in the device 118 or is provided with OMA-DM or a similar protocol. Note that the 3GPP specifications (specifically, TS 24.334 clause 5.1.1) define that OMA-DM is used for provisioning UE with ProSe authorization data, including the PLMNs in which a UE can perform monitoring and/or announcing.

UE-1 120 and UE-2 122 are ProSe-capable UE and have performed the Announce Request procedure (for instance as specified in 3GPP TS 23.303) and therefore have received using messaging 204 and 208 ProSe Code 1 and ProSe Code 2, respectively, from their ProSe functions in the network via a PC3 interface. As mentioned earlier, a ProSe Code does not contain any UE or user identities and, thus, cannot be used by the IoT device 118 to derive sensitive UE or user information.

UE-1 120 and UE-2 122 transmit, 206 and 210 their ProSe codes in the appropriate D2D radio channels in order to announce their presence to nearby devices. For one embodiment, these codes are transmitted in the clear. Moreover, each code includes: a pseudo-random value (called a temporary id in 3GPP specs); a PLMN identity; and a message integrity code (MIC), as specified in 3GPP TS 33.303. The MIC is used to integrity protect the ProSe codes and make sure they are not transmitted by malicious UE. A MIC value can be, for instance, derived in the UE by hashing the allocated ProSe code and a 128-bit discovery key as specified in 3GPP TS 33.303. The discovery key is sent to UE during the Announce Request procedure.

The IoT device 118 performs monitoring on the assigned D2D radio resources and detects the two ProSe codes along with their MIC values. The IoT device 118 sends 212 the detected ProSe codes (including the MIC values) to the SCS 104, which forwards 214 the ProSe codes to the IoT AS 116. The IoT AS 116 sends 216 the received ProSe codes (including the MIC values) to the User Profile Device 1 106 in PLMN-1. The User Profile Device 1 106 determines that the ProSe Code 1 has been assigned by PLMN-1 and that the ProSe Code 2 has been assigned by PLMN-2. This can be determined because, as specified in 3GPP TS 23.003, each ProSe code contains the identity of the PLMN that assigned the ProSe code.

The User Profile Device 1 requests 218 from the ProSe Function 1 in PLMN-1 to provide 222 a UE identity (e.g. IMSI) associated with ProSe Code 1. The ProSe Function 1 determines the UE identity associated with ProSe Code 1 and verifies that the received MIC value is correct. After receiving the UE identity, the User Profile Device 1 determines the "profile" corresponding to this UE identity. For one embodiment, the profile is characterized in terms of a traffic profile and service preferences, for instance gaming, business, shopping, etc. These profiles can be derived by monitoring the traffic of each user (e.g. the websites visited by the user) and determining the preferences of the user. For example, Domain Name System (DNS) queries of a UE can be used to determine the domains visited by the user and then utilize website classification services (e.g. WebSimilar.com) to identify the types of these domains (e.g. travel, shopping/electronics, gaming, etc.). Based on this information, a profile which characterizes the preferences or interests of a user can be established.

The User Profile Device 1 forwards 220 the ProSe Code 2 to the User Profile Device 2 in PLMN-2. An IP address of User Profile Device 2 can be either preconfigured or derived via a DNS query. The User Profile Device-2 requests 224 from the ProSe Function 2 in PLMN-2 to provide 226 the UE identity (e.g. IMSI) associated with ProSe Code 2. The ProSe Function 2 determines the UE identity associated with ProSe Code 2 and verifies that the received MIC value is correct. The User Profile Device 2 determines the profile corresponding to IMSI-2 and sends 228 to User Profile Device 1 the User Profile 2. The User Profile Device 1 sends 230 to IoT AS 116 the User Profile 1 and User Profile 2 which are the profiles of the two UE 120 and 122 that have been detected by the IoT device 116. The IoT AS 116 stored these profiles, at 232.

Based on the received User Profile 1 and User Profile 2, the AS 116 derives some "adaptation data" and sends 234 and 236 this data to the IoT device 118 via the SCS 104. The term "adaptation data" is a general term that refers to any kind of data that can be used by the IoT device to adapt 238 its behavior in a way that takes into account the presence of the two UE. For an alternative embodiment, the IoT AS 116 provides 240 and 242 the user profiles for UE 1 and 2 to the IoT device 118 through the SCS 104. The IoT device 118 generates 244 the adaptation data that it uses to modify its behavior.

In the example mentioned above, if the IoT device 118 is an advertising display and the User Profile 1 and User Profile 2 indicate that the user of UE-1 likes baseball while the user of UE-2 likes electronics, the adaptation data could indicate to the IoT device 118 to presents advertisements related to baseball and electronics. The IoT AS 116 stores the mapping between a ProSe Code and a User Profile. When the IoT device 118 stops detecting ProSe Code 1 or ProSe Code 2 or both, it informs the AS 116 which responds with new adaptation data. Such an illustration is given by reference to FIG. 3

Figure 3:
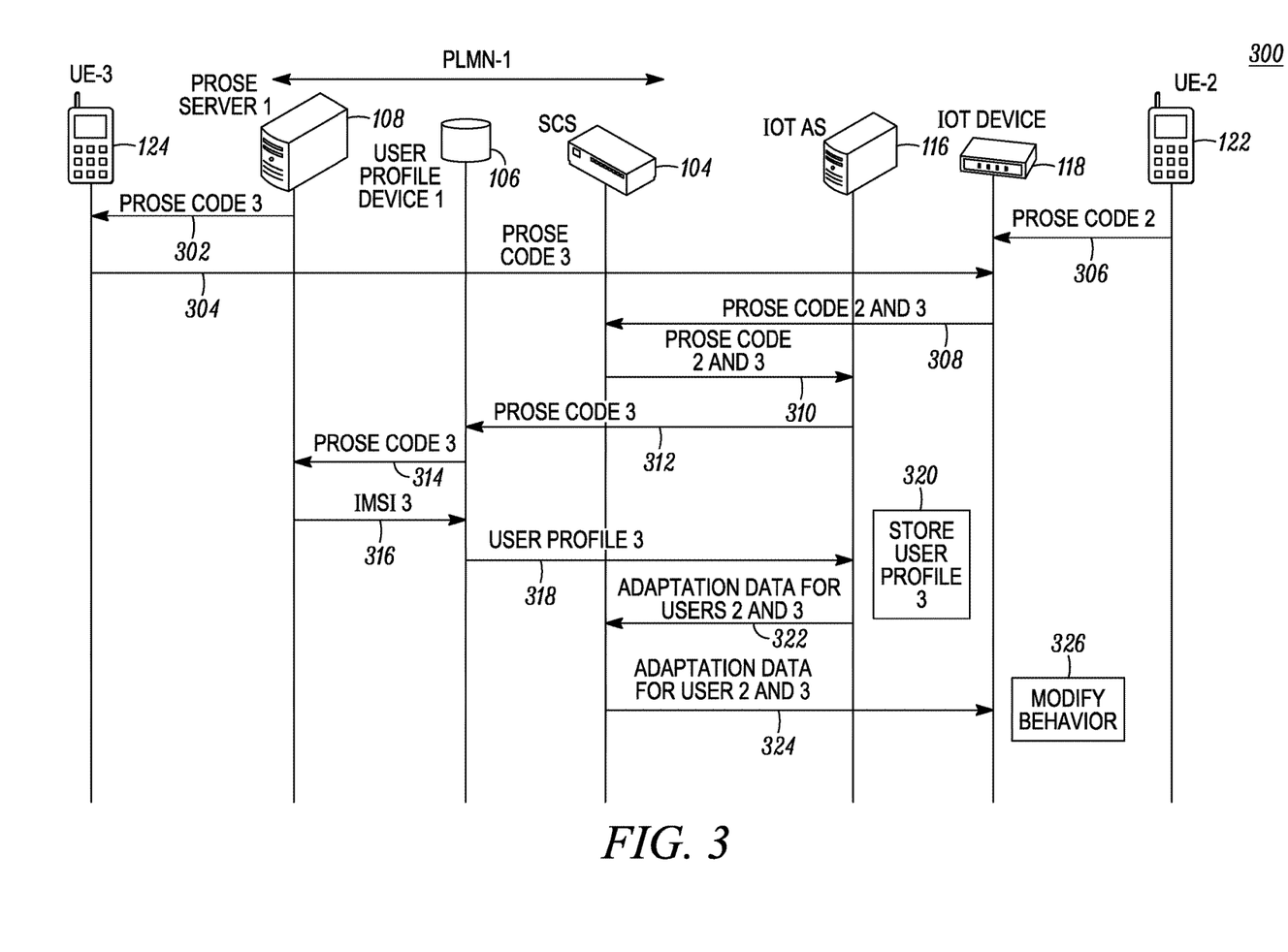
FIG. 3 is a message sequence diagram illustrating collaborative functionality for facilitating modifying behavior of an Internet-of-Things device based on proximal presence of one or more mobile devices in accordance with another embodiment.

FIG. 3 is a message sequence diagram 300 illustrating collaborative functionality for facilitating modifying behavior of the IoT device 118 based on proximal presence of one or more mobile devices, consistent with the present teachings. Diagram 300 shows messages being exchanged between two or more of the devices of: UE-3 124; the ProSe server 1 108 of the PLMN-1 102; the User Profile Device 1 106 of the PLMN-1 102; the SCS 104 of the PLMN-1 102; the IoT AS 116; the IoT device 118; and UE-2 122. The message exchanges can be in accordance with any suitable protocol either standard or proprietary including, but not limited to, OAuth protocol, Hypertext Transfer Protocol (HTTP), Internet Protocol (IP), etc.

The message sequence diagram 300 correlates to a point in time when the UE-1 120 is no longer proximate to the IoT device 118. However, during this time frame, the UE 122 and 124 are proximate to the IoT device 118. UE-3 124 is also ProSe-capable and has performed the Announce Request procedure (for instance as specified in 3GPP TS 23.303) and therefore has received 302 ProSe code 3 from its ProSe Server 1 108 in the network via a PC3 interface.

UE-3 124 and UE-2 122 transmit, 304 and 306 respectively, their ProSe codes in the appropriate D2D radio channels in order to announce their presence to nearby devices. The IoT device 118 performs monitoring on the assigned D2D radio resources and detects the two ProSe codes along with their MIC values. The IoT device 118 sends 308 the detected ProSe codes to the SCS 104, which forwards 310 the ProSe codes to the IoT AS 116. The IoT AS 116 detects that it already has a user profile corresponding to ProSe code 2 and need only determine a user profile corresponding to the ProSe code 3. Accordingly, the IoT AS 116 sends 312 the ProSe code 3 to the User Profile Device 1 in PLMN-1. The User Profile Device 1 determines that the ProSe Code 3 has been assigned by PLMN-1.

The User Profile Device 1 requests 314 from the ProSe Server 1 in PLMN-1 to provide 316 the UE identity (e.g. IMSI) associated with ProSe Code 3. The ProSe Server 1 determines the UE identity associated with ProSe Code 3. After receiving the UE identity, the User Profile Device 1 determines the profile corresponding to this UE identity. The User Profile Device 1 sends 318 to IoT AS 116 the User Profile 3 which is the profile of the user of UE-3 124, which the IoT AS 116 stores, at 320. Based on the received User Profile 3 and User Profile 2, the IoT AS 116 derives some modified adaptation data and sends 322 and 324 this data to the IoT device 118 via the SCS 104, which the IoT device 118 uses to adapt 326 its behavior based on the proximal presence of UE 122 and 124.

Figure 4:
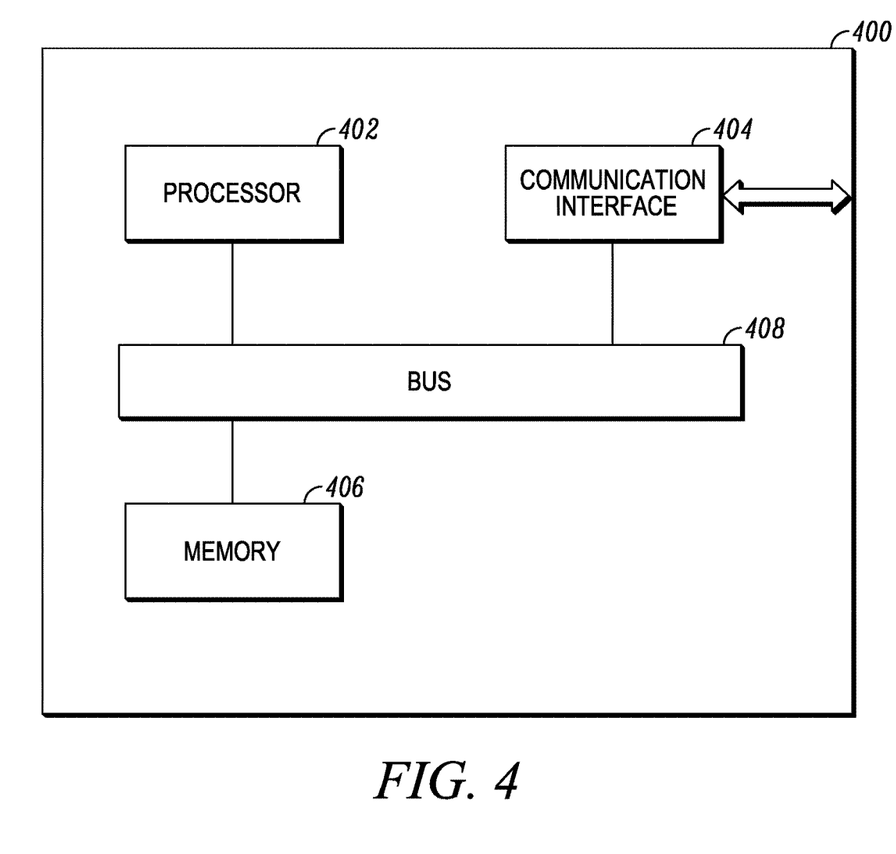
FIG. 4 is a block diagram illustrating internal hardware components of a device configurable to facilitate modifying behavior of an Internet-of-Things device based on proximal presence of one or more mobile devices in accordance with some embodiments.

FIG. 4 shows a block diagram illustrating example internal hardware components of a device 400, for example the IoT server 116, the IoT device 118, or the user profile devices 106 or 112 as illustrated in FIG. 1. The device 400 can be configured to facilitate modifying behavior of an IoT device based on proximal presence of a mobile device according to the present teachings. "Adapted," "operative," "capable" or "configured," as used herein, means that the indicated device or components are implemented using one or more hardware elements, which may or may not be programmed with software and/or firmware as the means for the indicated components to implement their desired functionality.

As shown in FIG. 4, the internal hardware elements or components of the device 400 include at least one of each of a processor 402, a communication interface 404, and a memory component 406. As further illustrated, the internal components of the device 400 are operatively coupled to one another, and in communication with one another, by way of one or more internal communication links 408, for instance an internal bus. A limited number of device components 402, 404, 406, and 408 are shown for ease of illustration, but other embodiments may include a lesser or greater number of such components in the device 400. Moreover, other well-known elements needed for a commercial embodiment of the device 400 may be omitted from FIG. 4 for brevity.

We now turn to a brief description of the components within the block diagram 400. The communication interface 404 allows for communication between the device 400 and other devices, such as an IoT device, a ProSe server, or another user profile device. For one embodiment, the communication interface 404 includes a wired communication interface for communicating using one or more protocols including, but not limited to, standard protocols supported by OMA and 3GPP. For another embodiment, for instance where the device 400 is the IoT device 118, the communication interface 404 includes one or more wireless transceivers such as one or more wireless transceivers configured to implement peer-to-peer communications using technology such as LTE-Direct, BLE, etc.

The processor 402 includes arithmetic logic and registers necessary to perform the digital processing required by the device 400 to, for example, facilitate modifying behavior of an IoT device based on proximal presence of one or more mobile devices in a manner consistent with the embodiments described herein. For one embodiment, the processor 402 represents a primary microprocessor or central processing unit (CPU) of the device 400, such as an application processor of a IoT application server or the CPU of a ProSe server or user profile device. Depending, at least in part, on the particular function being performed and a given device 400 design, various functionality or protocols may be executed by the processor 400 in hardware or as software or firmware code.

The memory component 406 represents one or more memory elements of any of a variety of forms, for example read-only memory, random access memory, static random access memory, dynamic random access memory, etc. In an embodiment, the processor 402 uses the memory component 406 to store and retrieve data. In some embodiments, the memory component 406 is integrated with the processor 402 into a single component such as on an integrated circuit. However, such a single component still usually has distinct portions/sections that perform the different processing and memory functions. The data that is stored by the memory component 406 includes, but need not be limited to, operating systems, programs (e.g., applications, protocols, and other code), and informational data.

As mentioned above, the device 400 can be configured to facilitate modifying behavior of an IoT device based on proximal presence of one or more mobile devices according to the present teachings. For one example, when the device 400 is configured as an IoT application server, e.g., the IoT AS 116, the device 400 performs a method for modifying behavior of an Internet-of-things device based on proximal presence of a mobile device. The method includes receiving a first presence code that indicates proximal presence of a first mobile device without identifying a user of the first mobile device, providing the first presence code to a first network that manages user profiles, and receiving, from the first network, a first profile for the user of the first mobile device. The method further includes determining, based on the first profile, first adaptation data for an Internet-of-things device in proximity to the first mobile device. The first adaptation data is used to modify behavior of the Internet-of-things device based on the proximal presence of the first mobile device. For an example, the first adaptation data includes the first profile or data derived from the first profile. For another example, the first adaptation data is used to modify output data displayed by the Internet-of-things device based on the proximal presence of the first mobile device.

For a particular embodiment, the first profile includes data concerning the user of the first mobile device without identifying the user of the first mobile device, and the data can indicate at least one of an interest or a preference of the user of the first mobile device. For one implementation, the method performed by the IoT AS further includes providing the first adaptation data to the Internet-of-things device to use in determining output data that correlates to the interest and/or preference of the user of the first mobile device. Alternatively, the IoT AS determines, from the first adaptation data, output data that correlates to the interest and/or preference of the user of the first mobile device and provides the output data to the Internet-of-things device.

For an embodiment compatible with 3GPP technical specifications, the first presence code is a proximity-related services code allocated by a proximity-related services function within a 3rd Generation Partnership Project network. For example, the proximity-related services code includes a random or pseudo-random value, a network identifier, and a message integrity code.

Multiple mobile devices may be proximate to the IoT device at any given time. Accordingly, the method performed by the IoT AS can further include receiving a second presence code that indicates proximal presence of a second mobile device without identifying a user of the second mobile device. The IoT AS provides the second presence code to the first network and receives, from the first network, a second profile for the user of the second mobile device. For one embodiment, the first network sends the second presence code to a second network that manages user profiles. The second network provides the second profile to the first network. Further to this embodiment, the method includes receiving an indication that the first and second mobile devices have simultaneous proximal presence to the Internet-of-things device. Thus, the first adaptation data is used to modify the behavior of the Internet-of-things device based on the proximal presence of both the first and second mobile devices. This indication could include, for example, the IoT server receiving from the IoT device a message that includes the ProSe codes of both the first and second mobile devices or receiving from the IoT device one message with the ProSe code of the first mobile device and receiving within a threshold time period another message with the ProSe code of the second mobile device.

The method performed by the IoT AS can accommodate changes in the mobile device that are proximate to the IoT device. For instance, where the IoT AS receives an indication that the first mobile device no longer has proximal presence to the Internet-of-things device, the IoT AS determines, based on the second profile, second adaptation data for the Internet-of-things device. The second adaptation data is, therefore, used to modify the behavior of the Internet-of-things device based on the proximal presence of the second mobile device but not the proximal presence of the first mobile device. For embodiments, the indication includes, but is not limited to, the IoT AS server failing to receive the ProSe code of the first mobile device from the IoT device for a threshold time period or the IoT AS receiving messaging from the IoT device indicating only the ProSe code of the second mobile device.

For yet another embodiment, the method performed by the IoT AS includes receiving the second presence code that indicates proximal presence of the second mobile device without identifying a user of the second mobile device. However, instead of going through the first network, the IoT AS provides the second presence code directly to a second network that manages user profiles. Accordingly, the IoT AS receives the second profile for the user of the second mobile device directly from the second network. "Directly" as used in this context means without going through the user profile device of the first network.

For another example, when the device 400 is configured as a user profile device, e.g., the user profile device 106 or 112, the device 400 performs a method for modifying behavior of an Internet-of-things device based on proximal presence of a mobile device. The method includes receiving a first presence code from a server that communicates with an Internet-of-Things device. The first presence code indicates proximal presence of a first mobile device to the Internet-of-Things device without identifying a user of the first mobile device. The method also includes providing the first presence code to a network element of a first network, and responsively receiving an identifier. The method further includes determining a first user profile that corresponds to the identifier and providing the first user profile to the server.

The first user profile includes data concerning the user of the first mobile device without identifying the user of the first mobile device. Moreover, the first user profile is used for determining first adaptation data for the Internet-of-things device in proximity to the first mobile device. The first adaptation data is used to modify behavior of the Internet-of-things device based on the proximal presence of the first mobile device.

When multiple mobile devices are proximate the IoT device, the method performed by the user profile device can further include receiving a second presence code from the server. The second presence code indicates proximal presence of a second mobile device to the Internet-of-Things device without identifying a user of the second mobile device. The user profile device provides the second presence code to a user profile device of a second network, and responsively receiving a second user profile that includes data concerning the user of the second mobile device without identifying the user of the second mobile device. The user profile device provides the second user profile to the server.

Further embodiments of the present teachings include a system for adapting behavior of an Internet-of-things device based on proximal presence of a mobile device. The system includes an IoT AS and an IoT device. The server includes a communication interface and processor communicatively coupled and cooperatively configured to receive, from an Internet-of-things device, a first set of presence codes. Each presence code indicates proximal presence of a corresponding mobile device, in a first set of mobile devices, without identifying a user of the mobile device. The server is further configured to provide the first set of presence codes to a set of user profile devices in one or more networks and receive, from the set of user profile devices, a first set of profiles. Each profile indicates at least one of an interest or a preference of one of the users of one of the mobile devices in the first set of mobile devices. The server is configured to determine adaptation data based on the first set of profiles. The adaptation data is used to adapt behavior of the Internetof-things device based on the proximal presence of each mobile device in the first set of mobile devices. The server can also be configured to receive, from the Internet-of-things device, a second set of presence codes that indicates proximal presence of a second and difference set of mobile devices and determine modified adaptation data that is used to adapt the behavior of the Internet-of-things device based on proximal presence of each mobile device in the second and different set of mobile devices.

For an embodiment, the IoT device includes a communication interface and processor communicatively coupled and cooperatively configured to monitor a device-to-device communication channel to detect the first set of presence codes. The IoT device is further configured to provide the first set of presence codes to the server and receive, from the server, the adaptation data or output data derived from the adaptation data to use in adapting the behavior of the Internet-of-things device.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for modifying behavior of an Internet-of-things device based on proximal presence of a mobile device, the method comprising:

receiving, at an Internet-of-things server, a first presence code from the Internet-of-things device, the first presence code indicating proximal presence of a first mobile device to the Internet-of-things device without identifying a user of the first mobile device and without identifying the first mobile device, wherein the first presence code is detected by the Internet-of-things device by monitoring a device-to-device communication channel;

providing the first presence code from the Internet-of-things server to a first network device that manages user profiles for users associated with a first network;

receiving, at the Internet-of-things server and from the first network device, a first profile for the user of the first mobile device based on the first presence code; and determining, based on the first profile, first adaptation data for the Internet-of-things device in proximity to the first mobile device, wherein the first adaptation data is used to modify behavior of the Internet-of-things device based on the proximal presence of the first mobile device.

2. The method of claim 1, wherein the first profile includes data concerning the user of the first mobile device without identifying the user of the first mobile device.

3. The method of claim 2, wherein the data concerning the user of the first mobile device indicates at least one of an interest or a preference of the user of the first mobile device.

4. The method of claim 3 further comprising providing the first adaptation data to the Internet-of-things device to use in determining output data that correlates to the at least one of the interest or the preference of the user of the first mobile device.

5. The method of claim 3 further comprising:
determining, from the first adaptation data, output data that correlates to the at least one of the interest or the preference of the user of the first mobile device;
providing the output data to the Internet-of-things device.

6. The method of claim 1, wherein the first presence code is a proximity-related services code allocated by a proximity-related services function within a 3rd Generation Partnership Project network.

7. The method of claim 6, wherein the proximity-related services code comprises a random or pseudo-random value, a network identifier, and a message integrity code.

8. The method of claim 1 further comprising:
receiving, at the Internet-of-things server, a second presence code from the Internet-of-things device, the second presence code indicating proximal presence of a second mobile device to the Internet-of-things device without identifying a user of the second mobile device and without identifying the second mobile device;
providing the second presence code from the Internet-of-things server to the first network device; and
receiving, at the Internet-of-things server and from the first network device, a second profile for the user of the second mobile device based on the second presence code.

9. The method of claim 8 further comprising receiving, at the Internet-of-things server, an indication that the first and second mobile devices have simultaneous proximal presence to the Internet-of-things device, wherein the first adaptation data is used to modify the behavior of the Internet-of-things device based on the proximal presence of both the first and second mobile devices.

10. The method of claim 8, wherein the first network device sends the second presence code to a second network device that manages user profiles for users associated with a second network, and wherein the second network device provides the second profile to the first network device based on the second presence code.

11. The method of claim 8 further comprising:
receiving, at the Internet-of-things server, an indication that the first mobile device no longer has proximal presence to the Internet-of-things device; and
determining, based on the second profile, second adaptation data for the Internet-of-things device, wherein the second adaptation data is used to modify the behavior of the Internet-of-things device based on the proximal presence of the second mobile device but not the proximal presence of the first mobile device.

12. The method of claim 1 further comprising:
receiving, at the Internet-of-things server, a second presence code from the Internet-of-things device, the second presence code indicating proximal presence of a second mobile device to the Internet-of-things device without identifying a user of the second mobile device and without identifying the second mobile device;
providing the second presence code directly from the Internet-of-things server to a second network device that manages user profiles for users associated with a second network; and
receiving, at the Internet-of-things server and directly from the second network device that manages user profiles, a second profile for the user of the second mobile device based on the second presence code.

13. The method of claim 1, wherein the first adaptation data is used to modify output data displayed by the Internet-of-things device based on the proximal presence of the first mobile device.

14. The method of claim 1, wherein the first adaptation data comprises the first profile or data derived from the first profile.

15. A system for adapting behavior of an Internet-of-things device based on proximal presence of a mobile device, the system comprising:
a server comprising:
a communication interface and processor communicatively coupled and cooperatively configured to:
receive, from an Internet-of-things device, a first set of presence codes, wherein each presence code indicates proximal presence of a corresponding mobile device to the Internet-of-things device without identifying a user of the mobile device and without identifying the mobile device, and wherein the first set of presence codes is detected by the Internet-of-things device by monitoring a device-to-device communication channel;
provide the first set of presence codes to a set of user profile devices in one or more networks, each of the user profile devices to manage user profiles for users associated with the respective networks;
receive, from the set of user profile devices, a first set of profiles, wherein each profile indicates at least one of an interest or a preference of one of the users of one of the mobile devices in the first set of mobile devices based on the presence code corresponding to the one of the mobile devices; and
determine adaptation data based on the first set of profiles, wherein the adaptation data is used to adapt behavior of the Internet-of-things device based on the proximal presence of each mobile device in the first set of mobile devices.

16. The system of claim 15, wherein the communication interface and processor are further cooperatively configured to:
receive, from the Internet-of-things device, a second set of presence codes, wherein each of the presence codes of the second set of presence codes indicates proximal presence of a corresponding mobile device in a second and different set of mobile devices to the Internet-of-things device without identifying a user of the mobile device and without identifying the mobile device; and
determine modified adaptation data that is used to adapt the behavior of the Internet-of-things device based on proximal presence of each mobile device in the second and different set of mobile devices.

17. The system of claim 15, wherein the communication interface and processor are further cooperatively configured to provide, from the server to the Internet-of-things device, the adaptation data or output data derived from the adaptation data to use in adapting the behavior of the Internet-of-things device, wherein the adaptation data is based on the first set of presence codes provided to the server from the Internet-of-things device.

* * * * *